(12) United States Patent
Altknecht et al.

(10) Patent No.: US 10,186,295 B2
(45) Date of Patent: *Jan. 22, 2019

(54) DISC GRIPPER FOR STORAGE DISC

(71) Applicant: International Business Machines Corporation, Armonk, NY (US)

(72) Inventors: David J. Altknecht, San Jose, CA (US); John S. Best, San Jose, CA (US); Donald S. Bethune, San Jose, CA (US); William M. Dyer, San Jose, CA (US); A. David Erpelding, San Jose, CA (US); Steven R. Hetzler, Los Altos, CA (US); Drew B. Lawson, Aptos, CA (US); Daniel F. Smith, Felton, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/494,368

(22) Filed: Apr. 21, 2017

(65) Prior Publication Data
US 2017/0232619 A1    Aug. 17, 2017

Related U.S. Application Data

(63) Continuation of application No. 15/046,401, filed on Feb. 17, 2016.

(51) Int. Cl.
*G11B 17/022* (2006.01)
*G11B 17/08* (2006.01)
(Continued)

(52) U.S. Cl.
CPC ........ *G11B 17/022* (2013.01); *G11B 17/0284* (2013.01); *G11B 17/08* (2013.01);
(Continued)

(58) Field of Classification Search
CPC ....... G11B 17/08; G11B 17/22; G11B 17/225; G11B 17/0284
See application file for complete search history.

(56) References Cited

U.S. PATENT DOCUMENTS

| | | | |
|---|---|---|---|
| 4,173,427 A | * | 11/1979 | Beuch ................ G11B 17/047 198/468.2 |
| 4,633,452 A | | 12/1986 | Shimbo et al. |

(Continued)

FOREIGN PATENT DOCUMENTS

| | | |
|---|---|---|
| CN | 102598136 A | 7/2012 |
| CN | 204149156 U | 2/2015 |

(Continued)

OTHER PUBLICATIONS

Watanabe, A et al., "Optical library system for Long-term preservation with extended error correction coding", Proceedings of the IEEE Symposium on Massive Storage Systems and Technologies, 2013, pp. 1-18, IEEE Computer Society, United States.

(Continued)

*Primary Examiner* — Brian E Miller
(74) *Attorney, Agent, or Firm* — Sherman IP LLP; Kenneth L. Sherman; Steven Laut (57) ABSTRACT

An apparatus includes a first jaw device, a second jaw device, and a disc sensor configured to sense presence of a storage disc between the first jaw device and the second jaw device. The first jaw device and the second jaw device form a gripper device configured to clamp a particular portion of a storage disc including an arc segment along an outer edge of adjacent surfaces of the storage disc.

20 Claims, 6 Drawing Sheets

(51) Int. Cl.
  *G11B 17/028* (2006.01)
  *G11B 17/22* (2006.01)
  *G11B 17/28* (2006.01)
(52) U.S. Cl.
  CPC ............ *G11B 17/22* (2013.01); *G11B 17/225* (2013.01); *G11B 17/28* (2013.01)

(56) References Cited

U.S. PATENT DOCUMENTS

| | | | |
|---|---|---|---|
| 4,695,990 | A | 9/1987 | Kawakami |
| 4,815,057 | A | 3/1989 | Miller et al. |
| 4,901,172 | A | 2/1990 | Nakazawa et al. |
| 4,989,191 | A | 1/1991 | Kuo |
| 5,067,116 | A | 11/1991 | Kadrmas |
| 5,136,562 | A | 8/1992 | Staar |
| 5,207,727 | A | 5/1993 | Pearce et al. |
| 5,253,911 | A | 10/1993 | Egan et al. |
| 5,274,620 | A | 12/1993 | Sipos |
| 5,289,441 | A | 2/1994 | Domberg et al. |
| 5,292,222 | A | 3/1994 | Malagrino et al. |
| 5,481,514 | A | 1/1996 | Yamasaki et al. |
| 5,528,566 | A | 6/1996 | McGee et al. |
| 5,544,148 | A | 8/1996 | Nakamichi |
| 5,550,801 | A | 8/1996 | Enomoto et al. |
| 5,555,239 | A | 9/1996 | Takai et al. |
| 5,586,094 | A | 12/1996 | Pines et al. |
| 5,588,796 | A | 12/1996 | Ricco |
| 5,610,902 | A | 3/1997 | Childers et al. |
| 5,631,785 | A | 5/1997 | Dang et al. |
| 5,726,967 | A | 3/1998 | Tanaka et al. |
| 5,729,524 | A | 3/1998 | Pines |
| 5,754,519 | A | 5/1998 | Bando |
| 5,764,617 | A | 6/1998 | Furusawa et al. |
| 5,798,998 | A | 8/1998 | Fukushima |
| 5,805,561 | A | 9/1998 | Pollard |
| 5,923,638 | A | 7/1999 | Watanabe |
| 5,953,293 | A | 9/1999 | Kajiyama et al. |
| 5,959,958 | A | 9/1999 | Inatani et al. |
| 5,978,323 | A | 11/1999 | Nakamura |
| 6,064,544 | A | 5/2000 | Wada |
| 6,084,832 | A | 7/2000 | Furusawa et al. |
| 6,122,231 | A | 9/2000 | Watanabe et al. |
| 6,212,139 | B1 | 4/2001 | Nakamura et al. |
| 6,373,796 | B1 | 4/2002 | Herring et al. |
| 6,454,509 | B1 | 9/2002 | Kappel et al. |
| 6,493,178 | B1 | 12/2002 | Brace et al. |
| 6,587,405 | B1 | 7/2003 | Klein |
| 6,683,827 | B1 | 1/2004 | Omoto et al. |
| 6,731,455 | B2 | 5/2004 | Kulakowski et al. |
| 6,802,070 | B2 | 10/2004 | Britz et al. |
| 7,145,841 | B1 | 12/2006 | Miller |
| 7,193,810 | B2 | 3/2007 | Dickey et al. |
| 7,212,375 | B2 | 5/2007 | Dickey |
| 7,234,913 | B2 | 6/2007 | Heiland et al. |
| 7,673,309 | B2 | 3/2010 | Douglass et al. |
| 7,777,985 | B2 | 8/2010 | Barkley |
| 8,041,449 | B2 | 10/2011 | Noble |
| 8,042,123 | B2 | 10/2011 | Terzis et al. |
| 8,134,799 | B1 | 3/2012 | Ostwald |
| 8,276,170 | B2 | 9/2012 | Douglass et al. |
| 8,281,327 | B2 | 10/2012 | Goto et al. |
| 8,341,653 | B2 | 12/2012 | Terzis et al. |
| 8,385,163 | B2 | 2/2013 | Goyal et al. |
| 8,701,862 | B2 | 4/2014 | Takasawa et al. |
| 8,824,250 | B2 | 9/2014 | Yoo |
| 8,899,406 | B2 | 12/2014 | Nespeca |
| 9,230,591 | B2 | 1/2016 | Kinoshita et al. |
| 9,428,336 | B2 | 8/2016 | Hagen et al. |
| 9,672,863 | B1 * | 6/2017 | Altknecht .......... G11B 17/0284 |
| 2003/0117938 | A1 | 6/2003 | Braitberg et al. |
| 2004/0080852 | A1 | 4/2004 | Jenkins et al. |
| 2005/0007896 | A1 | 1/2005 | Haas |
| 2006/0005209 | A1 | 1/2006 | Chiang |
| 2006/0021896 | A1 | 2/2006 | Cleathero et al. |
| 2006/0136950 | A1 | 6/2006 | Eberdorfer |
| 2007/0127323 | A1 | 6/2007 | Owens |
| 2013/0256164 | A1 | 10/2013 | Haggard |
| 2018/0211691 | A1 | 7/2018 | Altknecht et al. |

FOREIGN PATENT DOCUMENTS

| | | |
|---|---|---|
| EP | 1653461 A2 | 3/2006 |
| WO | 2010005624 A1 | 1/2010 |
| WO | 2014076978 A1 | 5/2014 |

OTHER PUBLICATIONS

International Search Report and Written Opinion dated Apr. 28, 2017 for International Application No. PCT/IB2017/0505592, pp. 1-12, State Intellectual Property Office of the P.R. China, Beijing, China.
U.S. Non-Final Office Action for U.S. Appl. No. 15/456,433 dated May 1, 2017.
U.S. Final Office Action for U.S. Appl. No. 15/456,433 dated Jul. 18, 2017.
U.S. Non-Final Office Action for U.S. Appl. No. 15/456,433 dated Sep. 18, 2017.
U.S. Notice of Allowance for U.S. Appl. No. 15/456,433 dated Jan. 26, 2018.
U.S. Corrected Notice of Allowance for U.S. Appl. No. 15/456,433 dated Apr. 24, 2018.
U.S. Non-Final Office Action for U.S. Appl. No. 15/925,994 dated May 1, 2018.
U.S. Non-Final Office Action for U.S. Appl. No. 15/046,395 dated Oct. 21, 2016.
U.S. Notice of Alllowance for U.S. Appl. No. 15/046,395 dated Mar. 30, 2017.
U.S. Non-Final Office Action for U.S. Appl. No. 15/046,401 dated Oct. 6, 2016.
U.S. Notice of Allowance for U.S. Appl. No. 15/046,401 dated Feb. 3, 2017.
U.S. Notice of Allowability for U.S. Appl. No. 15/046,401 dated Apr. 6, 2017.
U.S. Non-Final Office Action for U.S. Appl. No. 15/046,404 dated Sep. 8, 2016.
U.S. Notice of Allowance for U.S. Appl. No. 15/046,404 dated Dec. 16, 2016.
U.S. Notice of Allowability for U.S. Appl. No. 15/046,404 dated Feb. 1, 2017.
U.S. Non-Final Office Action for U.S. Appl. No. 15/078,857 dated Dec. 29, 2016.
U.S. Notice of Allowance for U.S. Appl. No. 15/078,857 dated Apr. 17, 2017.
U.S. Final Office Action for U.S. Appl. No. 15/925,994 dated Sep. 4, 2018.
U.S. Notice of Allowance for U.S. Appl. No. 15/925,994 dated Nov. 5, 2018.

* cited by examiner

DISC GRIPPER FOR STORAGE DISC

BACKGROUND

Disc libraries require a disc retrieval unit (DRU) to move discs between storage locations and the drives that read and write the data on the discs. This DRU must incorporate means to obtain a disc at a pickup location and release the disc at its destination location.

SUMMARY

One or more embodiments relate to transport of storage discs in disc storage systems. In one embodiment, an apparatus includes a first jaw device, a second jaw device, and a disc sensor configured to sense presence of a storage disc between the first jaw device and the second jaw device. The first jaw device and the second jaw device form a gripper device configured to clamp a particular portion of a storage disc including an arc segment along an outer edge of adjacent surfaces of the storage disc.

These and other features, aspects and advantages of the embodiments will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments include a disc gripper device that contacts a storage disc (e.g., an optical disc, etc.) only over a limited angular range in a narrow band near its outer edge. This allows the disc gripper to hold the disc until a disc retrieval unit (DRU) positions it in the desired location, such as a disc drive, a disc holder (e.g., a disc cassette), etc. In one embodiment, the disc gripper device maintains its hold on a disc in the absence of applied power and holds the disc securely enough to allow it to be accelerated rapidly. The disc gripper device further includes features to enable sensing the presence or absence of a disc.

One or more embodiments provide a disc gripper device for use in a disc library that holds a single disc as it is moved (without cartridge or other containing structure) directly between a library storage location and the hub of an appropriate disc drive. In one example, the disc gripper has a pair of jaw devices that clamp opposite surfaces of a storage disc within 2 mm or less of the disc outer edge, over an angular sector of less than 45° (as measured from the disc center). In one embodiment, a screw-driven actuator is used to move the pair of jaws to clamp the storage disc. Once the pair of jaws are closed on a storage disc, it is held tightly with no current supplied to the actuator. To release a storage disc, the actuator motor is reversed and the pair of jaws are positively driven to open. A disc sensor lever between the pair of jaws limits the depth to which a disc can enter, and pivots when pushed on by a storage disc so its position indicates the presence or absence of a disc. In one example, a spring positively moves the sensor lever to its "no disc present" position when the storage disc is released by the disc gripper device. In one example, the sensor lever also limits the extent to which the jaw devices can close. In other examples, alternative sensor arrangements are possible, such as the disc itself interrupts or reflects an optical beam, or contacts and actuates a switch to indicate the presence or absence of a disc in the disc gripper device. In one embodiment, the disc gripper may be mounted with sufficient compliance so discs entering the jaw devices laterally can be positioned to have slight vertical interference with the sensor lever, and will thus press against it with some net force, when the lever is in its limiting ("disc present") position.

Figure 1:
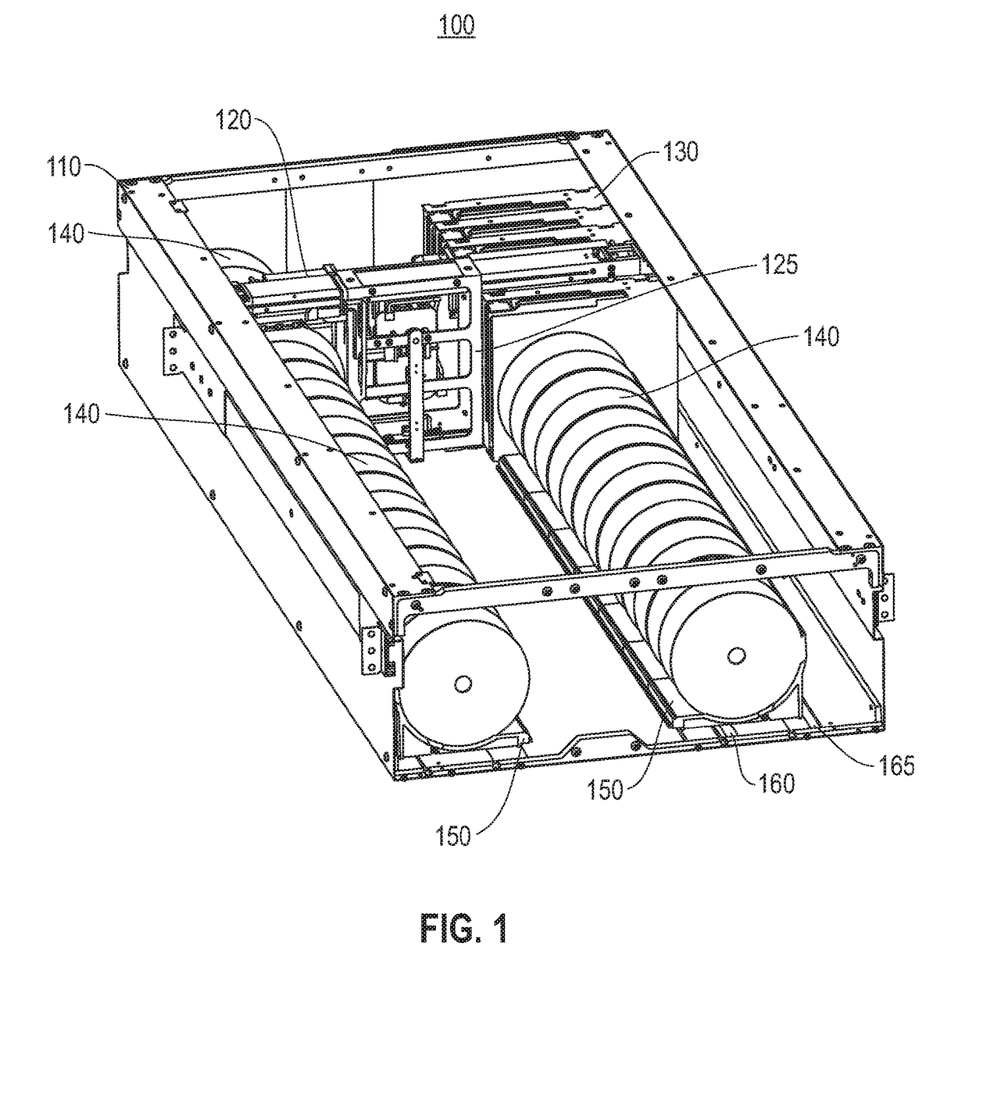
FIG. 1 is a high performance optical storage system that may implement a disc gripper device, according to an embodiment.

FIG. 1 is a high performance optical storage system 100 that may implement a disc gripper device 200 (FIG. 2), according to an embodiment. In one embodiment, the high performance optical storage system 100 includes an enclosure 110, a moveable arm 120 connected to a DRU 125 that includes a disc gripper device 200 (FIG. 2), multiple optical disc drives 130, multiple optical disc-based media (discs) 140, disc cassettes 150, and tracks 160 and 165 that hold the disc cassettes 150 in place. In one embodiment, the enclosure 110 provides a stable platform and protection from the environment. In one example, the enclosure includes filter material connected to cooling fans (not shown) and a top enclosure (not shown for internal viewing). In one embodiment, the enclosure may be sized as a typical 19-inch rack mounted device with rack mounting connectors. Depending on the space and enclosure size chosen, the enclosure 110 may have a greater capacity of optical disc drives 130, disc cassettes 150, and thus, discs 140. In one example, the disc cassettes 150 are placed within the enclosure 110 on either side (e.g., left and right sides) of the enclosure 110. In one example, additional disc cassettes 150 and discs 140 space is available adjacent the disc drives 130 (e.g., towards the front of the enclosure 110). In wider enclosures 110, more disc drives 130 may be positioned adjacent each other on the left and right side of the enclosure 110 when more available space for disc drives 130 is available. In one embodiment, the moveable arm 120 moves using motors and gears on tracks within the enclosure 110 to move the DRU 125 from the back of the enclosure 110 to the front of the enclosure 110. The DRU 125 is moveable to either side of the enclosure 110 to retrieve a disc 140 using the disc gripper device 200 for placement in a disc drive 130 or for replacement back to a disc cassette 150. In other embodiments, other configurations of stored discs 140, disc drives 130 and the DRU 125 may be used for employment of the disc gripper device 200 for disc placement, transport and loading (e.g., into a disc drive 130, into a disc holder or cassette 150), etc.

Figure 2:
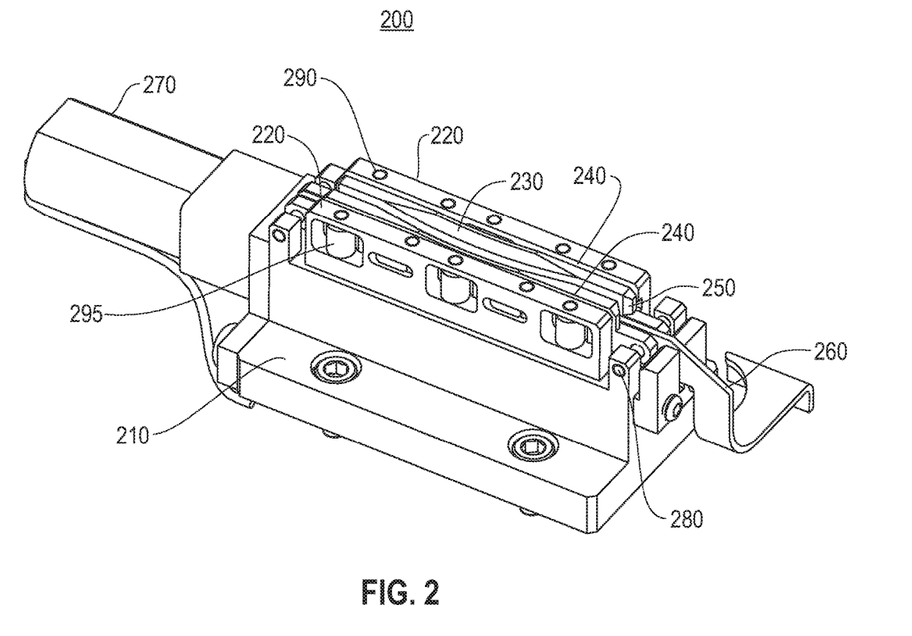
FIG. 2 is shows a disc gripper device, according to an embodiment.

FIG. 2 is shows a disc gripper device 200, according to an embodiment. In one embodiment, the disc gripper device 200 includes a housing or body 210, a caliper 220, a vertical jaw device chamfer 230, a pair of jaw devices 240, a lateral jaw device chamfer 250, a disc sensor lever 260, a motor 270, guide pin(s) 280, caliper pins 290 and caliper rollers 295. In one embodiment, the pair of device 240 are shaped to contact only a thin sector close to the edge of a storage disc 410 (FIG. 4), slide towards or away from each other on the pair of guide pins 280 supported by the disc gripper housing 210. The jaw devices 240 are driven closer together by the calipers 220 incorporating caliper rollers 295 on each side that contact ramps 310 (FIG. 3) on the outer surfaces of the jaw devices 240. The position of the storage disc in the jaw devices 240 is limited by a storage disc (e.g., storage disc 140, FIG. 1, storage disc 410, FIG. 4) contacting and moving the disc sensor lever 260. In an embodiment the position of the storage disc in the jaw devices 240 is limited by a storage disc (e.g., storage disc 140, FIG. 1, storage disc 410, FIG. 4) contacting the inner vertical edges (vertical jaw device chamfer 230) and lateral edges (lateral jaw device chamfer 250) of the disc gripper device 200 jaw devices 240 are chamfered to guide and align entering storage discs (e.g., storage disc 140, FIG. 1, storage disc 410, FIG. 4).

Figure 3:
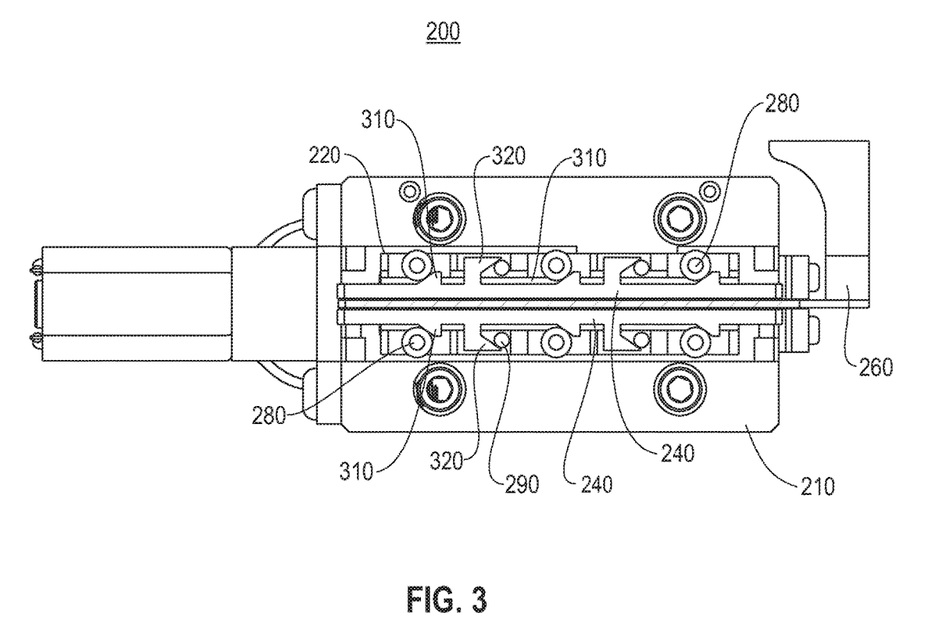
FIG. 3 shows a bottom view of the disc gripper device of FIG. 2, according to an embodiment.

FIG. 3 shows a bottom view of the disc gripper device 200 of FIG. 2, according to an embodiment. As shown, the disc gripper device 200 includes the contact ramps 310 and limiting angled elements 320. When the motor 270 is powered, the drive element 420 (e.g., a drive screw) (FIG. 4) is caused to move, which causes the contact ramps 310 to contact the caliper rollers 295 which move the caliper 220 further from the motor 270. This movement forces the contact ramps 310 against the caliper rollers 295 causes the jaw devices 240 to move toward one another for clamping a storage disc (e.g., storage disc 140, FIG. 1, storage disc 410, FIG. 4). It is obvious to one of ordinary skill in the art that both calipers can be moved towards each other or one caliper can be fixed as the other caliper is moved towards the other. The irreversible nature of the drive element 420 (e.g., a drive screw) (FIG. 4) sustains the clamping position of jaw devices 240. When the motor is powered to move the calipers 220 away from the motor 270, the force on the contact ramps 310 from the caliper rollers 295 is removed, which causes the jaw devices 240 to separate and release a clamped storage disc (e.g., storage disc 140, FIG. 1, storage disc 410, FIG. 4). Therefore, it can be seen that when a storage disc is clamped, no power is required to maintain the jaw devices 240 from clamping a storage disc.

Figure 4:
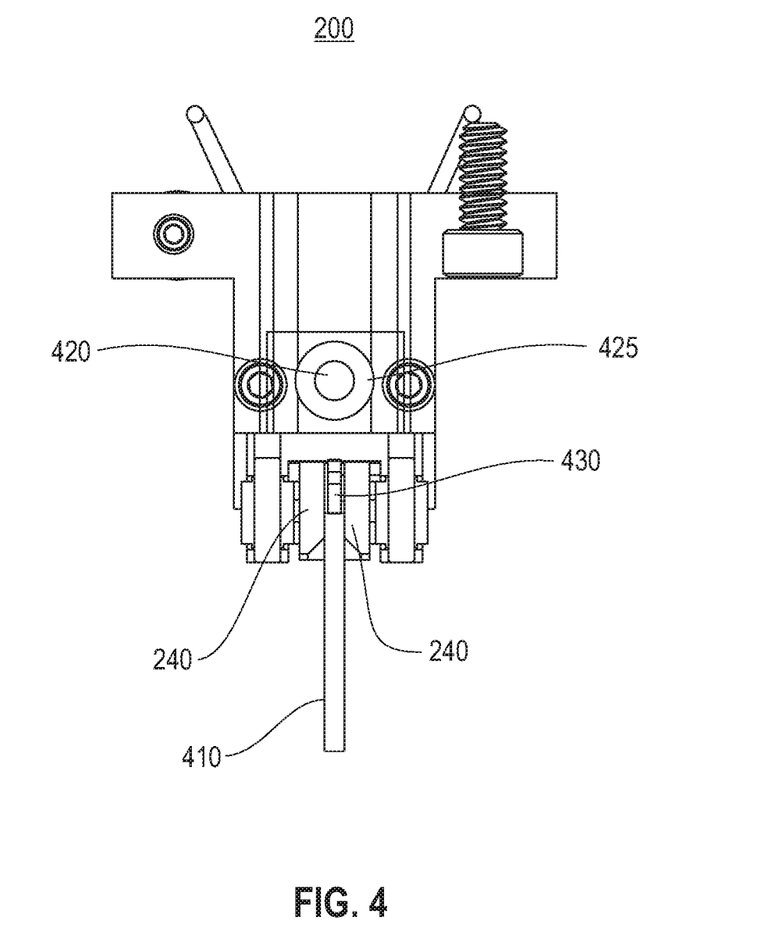
FIG. 4 shows a cross-sectional view of the disc gripper device of FIG. 2, according to an embodiment.

FIG. 4 shows a cross sectional view of the disc gripper device 200 of FIG. 2, according to an embodiment. As shown, the jaw devices 240 are closed on a storage disc 410. In one embodiment, the jaw devices 240 contact only the outermost 1.5 mm of the storage disc 410. The depth of disc 410 in the disc gripper device 200 is limited by the disc sensor lever 260 portion 430 between the jaw devices 240. Also shown is the drive element 420 and a support bearing 425.

Figure 5:
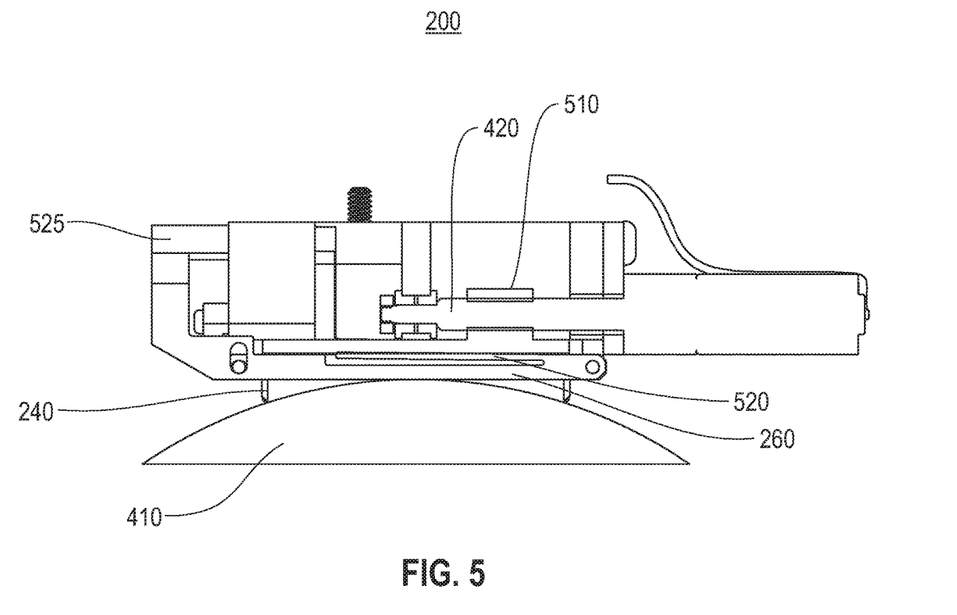
FIG. 5 is a longitudinal cross-section of a disc gripper device of FIG. 2 shown closed on a disc, according to an embodiment.

FIG. 5 is a longitudinal cross-section of the disc gripper device 200 of FIG. 2 shown closed on a disc 410, according to an embodiment. As shown, the disc gripper device 200 is closed on a disc 410. In one embodiment, the disc sensor lever 260 incorporates a spring portion 520. When a disc 410 is not present, the disc sensor lever 260 pivots on the pin to the right of the disc sensor lever 260, lowering the left end of the disc sensor lever 260 and the flag portion 525 of the disc sensor lever 260. With the flag portion 525 lower, the disc sensor lever 260 will indicate that no disc 410 is present. A threaded caliper boss 510 engages drive screw 420. As shown, the disc 410 and the disc sensor lever 260 are shown in their limiting "disc present" positions. In another embodiment the position of the storage disc in the jaw devices 240 is limited by a storage disc (e.g., storage disc 140, FIG. 1, storage disc 410, FIG. 4) contacting a component of disc gripper device 200, e.g., the threaded caliper boss 510 and disc gripper housing 210. A sensing device (e.g. a current limiter on a disc kicker device motor(s), or an encoder on a disc kicker device motor(s) 644, FIG. 6) on the DRU 125 senses when the storage disc is at the extent of its travel into the jaw devices 240 by preventing the disc kicker device motor from operating beyond a preset electrical current limit threshold.

FIG. 3 shows an alternative embodiment with one moving jaw driven by a caliper and a second fixed jaw. As shown, the disc gripper device 200 includes the contact ramps 310 and limiting angled elements 320. The contact ramps 320 contact the caliper rollers 280 when the motor 270 is powered to move the caliper 220 away from the disc sensor lever 260, the drive element 420 (FIG. 4) is caused to move. This movement forces the contact ramps 320 against the caliper rollers 280 causes the jaw device 240 to move toward the fixed jaw for clamping a storage disc (e.g., storage disc 140, FIG. 1, storage disc 410, FIG. 4). When the motor is powered to move the caliper 220 toward the disc sensor lever 260, the force on the contact ramps 320 from the caliper rollers 280 is removed, which causes the jaw device 240 to separate from the fixed jaw and release a clamped storage disc (e.g., storage disc 140, FIG. 1, storage disc 410, FIG. 4). Therefore, it can be seen that when a storage disc is clamped, no power is required to maintain the jaw devices 240 from clamping a storage disc.

It will be well understood that other driving mechanisms may be used, such as solenoids, springs, etc.

Figure 6:
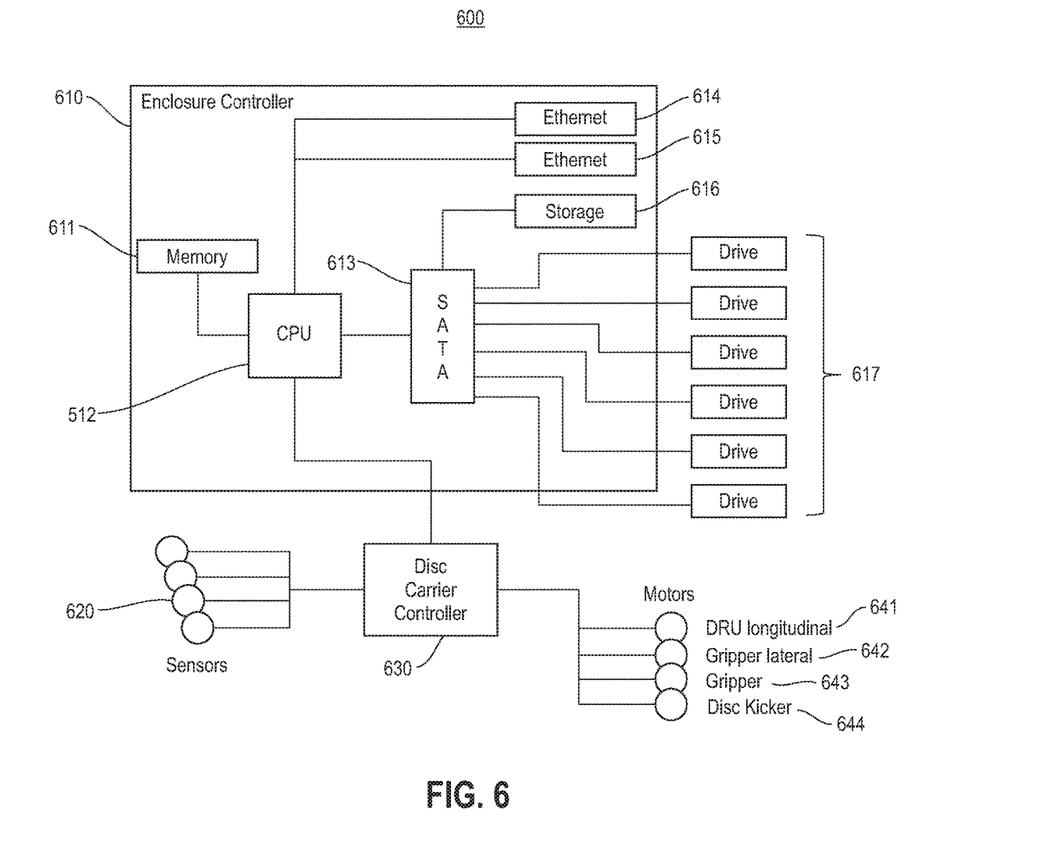
FIG. 6 shows control circuitry and electronics that may be implemented for the disc gripper device of FIG. 2 for the high performance optical storage system of FIG. 1, according to an embodiment.

FIG. 6 shows control circuitry and electronics 600 that may be implemented for the disc gripper device 200 (FIG. 2) for the high performance optical storage system of FIG. 1, according to an embodiment. In one embodiment, optical sensors of the sensor set 620 are used in the system to provide contactless position information for various moving components. In one example, optical sensors of the sensor set 620 on the disc carrier of the DRU 125 combined with the features of the disc cassettes 150 and the disc drives 130 allow the disc gripper device 200 to be positioned to within +−0.1 mm. Other sensors of the sensor set 620 are used to sense location of a disc kicker device of the DRU 125, whether a disc (e.g., storage disc 140, FIG. 1) is in the disc gripper device 200, the lateral position of the disc gripper device 200, etc. Sensors of the sensor set 620 may be used in concert with features on the disc cassettes 150 to facilitate positioning of the DRU 125 at disc locations. Other examples include referring to the discs themselves. Similarly, features may be disposed on the enclosure 110 or the disc drives 130 to facilitate accurate positioning of the DRU 125 when loading and unloading discs 140 from the disc drives 130. In another example, transmissive photointerrupter sensors may be utilized for position state sensing of the various components. The motors used in the system may be of the brushless DC type, optionally with shaft encoders to aid in position determination. In one example, the motors may include the DRU 125 longitudinal motor(s) 641, the disc gripper device 200 lateral motor(s) 642, the disc gripper device 200 motor 643 (also referring to motor 270, FIG. 2), the disc kicker device motor(s) 644, etc.

In one embodiment, the control electronics shown in the control circuitry and electronics 600 are partitioned into a robotic controller (the disc carrier controller 630) on the disc carrier and an enclosure controller 610 otherwise mounted in the enclosure 110 (FIG. 1). The latter does not move, and includes a CPU 612, memory 611 and associated components for running the control software. In one example the control circuitry and electronics 600 includes local storage for holding the operating system and the control software, although in another example may instead boot over a network and load the necessary software, or even boot off the optical media of a disc. In another example, flash memory storage is implemented. The enclosure controller 610 includes both the external interface to a host system or network as well as interfaces (SATA 613, storage interface 616) to the disc drives 130, collectively shown as a set 617. In one example, the external interface may include a network interface, such as Ethernet. In one embodiment, for enhanced reliability, the network interface would include two connections, such as Ethernet connections 614 and 615 with each directed to a separate switch. In another example, a third external interface might be used for system control and monitoring.

In one embodiment, the enclosure controller 610 is responsive to commands over the external interface to load a disc 140, read and write data, and perform other operations. In one example, the enclosure controller 610 communicates with the robotic controller (disc carrier controller 630) to send commands, such as to load a selected disc 140 (FIG. 1) in a selected disc drive 130. The enclosure controller 610 also includes a data buffer for holding read and write data during data transfers.

In one embodiment, the robotic controller (disc carrier controller 630) manages the robotic activities of the high performance optical storage system 100, including controlling the motors, reading optical and other sensor data and communicating state information with the enclosure controller 610. In one embodiment, the robotic controller (disc carrier controller 630) communicates with the enclosure controller 610 over a serial interface. The interface may be wired, such as universal serial bus (USB) over a flex cable, or wireless, such as infrared data association (IRDA), BLUETOOTH®, etc. In one example, on initialization, it is critical for the disc carrier controller 630 to determine the physical state of the high performance optical storage system 100 to prevent damage. If the high performance optical storage system 100 has undergone a controlled shutdown, this state information may be recorded within the library. Even so, this shutdown state needs to be confirmed. The high performance optical storage system 100 may have been powered down in an unknown state, such as by an unintended power loss. For example, before the DRU 125 can move longitudinally, the high performance optical storage system 100 must determine if a disc is in the disc gripper device 200 and if so, position the disc gripper device 200 within the drive carrier prior to a longitudinal move. In one embodiment, the sensors set 620 includes sensors to detect if the disc gripper device 200 is centered, or to the left or right of center. Thus, the disc gripper device 200 can be moved directly to the center position. Similarly, sensors of the sensor set 620 are provided to determine if the disc kicker device is centered, or to the left or right of center. Once both disc gripper device 200 and disc kicker device are centered, the DRU 125 may be moved longitudinally. All these functions are accomplished through means of the set of sensors 620. In one embodiment, optical sensors are used to make the position determinations.

In one embodiment, the high performance optical storage system 100 determines if discs are located within any of the disc drives 130. The disc drives 130 may be queried to see if a disc is loaded and spindle of a disc drive 130 clamped. It is possible for a disc to remain in a disc drive 130 but not be clamped by the spindle. This can be tested by attempting a clamp operation.

In one embodiment, an inventory manger is implemented that includes metadata for each disc 140 in the high performance optical storage system 100. In one example, the metadata may include the media type, bad block table or other initialization information, location of the disc within the enclosure 110, etc. The high performance optical storage system 100 can transmit this initialization information to a disc drive 130 upon the load operation, which substantially shortens the startup time. The inventory manager also queries the disc drive 130 on unload to obtain updates to the media.

In one example, metadata, such as changes in the bad block information, is stored by the inventory manager in nonvolatile storage which may be external to the high performance optical storage system 100. Any system metadata can be periodically flushed to specific locations on the media in the library to create self-described system state, such as for relocating a system. Alternatively, the metadata may be stored on other nonvolatile media in the enclosure controller 610.

In one embodiment, the high performance optical storage system 100 software includes a library executive, which is responsive to read, write, mount and dismount commands from a host system. The library executive forwards mount and dismount commands and information to the disc carrier controller 630. The mount command information includes the disc location in the disc cassette 150 to select and the disc drive 130 to load. The dismount command information includes information on the disc drive 130 to unload and the target location for storing the disc 140 in the disc cassette 150.

As will be appreciated by one skilled in the art, aspects of the embodiments may be a system, a method, and/or a computer program product at any possible technical detail level of integration. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the various embodiments with various modifications as are suited to the particular use contemplated.

What is claimed is:

1. An apparatus comprising:
a first jaw device;
a second jaw device; and
a disc sensor configured to sense presence of a storage disc between the first jaw device and the second jaw device, wherein the first jaw device and the second jaw device form a gripper device configured to clamp a particular portion of a storage disc comprising an arc segment along an outer edge of adjacent surfaces of the storage disc.

2. The apparatus of claim 1, wherein the particular portion is a data free surface of a storage disc, and the apparatus is configured to clamp and release storage discs in a disc storage system.

3. The apparatus of claim 1, wherein the gripper device is limited based on the disc sensor to contact a storage disc surface within 2 mm of an outer edge of the storage disc.

4. The apparatus of claim 1, wherein the first jaw device and the second jaw device each having a shape: configured to limit a contact area, a subtended angle, and edges chamfered to guide and align a storage disc entering between the first jaw device and the second jaw device vertically or laterally.

5. The apparatus of claim 1, wherein power is applied to a driving element both to release and to grip a storage disc by the gripper device, and the storage disc remains released or clamped in an absence of power applied to the motor.

6. The apparatus of claim 5, wherein the driving element comprises a drive screw configured to move a caliper with one or more of rollers and pins that contact wedge ramps of each of the first jaw device and the second jaw device to apply or release pressure on the storage disc front and back surfaces.

7. The apparatus of claim 1, wherein:
depth of a storage disc in the disc gripper device is limited by a disc sensor lever portion between the first jaw device and the second jaw device.

8. The apparatus of claim 1, further comprising:
a motor configured to drive a driving element within a housing; and
a caliper coupled to the housing and configured to force the first jaw device toward the second jaw device based on movement of the driving element.

9. An apparatus comprising:
a first jaw device;
a second jaw device; and
a caliper configured to force the first jaw device toward the second jaw device, wherein the first jaw device and the second jaw device form a gripper device configured to clamp a particular portion of a storage disc comprising an arc segment along an outer edge of adjacent surfaces of the storage disc.

10. The apparatus of claim 9, wherein the particular portion is a data free surface of a storage disc, and the apparatus is configured to clamp and release storage discs in a disc storage system.

11. The apparatus of claim 10, further comprising a disc sensor configured to sense presence of a storage disc and to limit insertion travel of a storage disc between the first jaw device and the second jaw device.

12. The apparatus of claim 10, further comprising a disc sensor disposed between the first jaw device and the second jaw device, wherein the disc sensor is configured to sense presence of a storage disc and to limit insertion travel of a storage disc between the first jaw device and the second jaw device.

13. The apparatus of claim 9, wherein the first jaw device and the second jaw device each having a shape: configured to limit a contact area, a subtended angle, and edges chamfered to guide and align a storage disc entering between the first jaw device and the second jaw device vertically or laterally.

14. The apparatus of claim 9, wherein power is applied to a driving element to both release and to grip a storage disc by the gripper device, and the storage disc remains released or clamped in an absence of power applied to a motor.

15. The apparatus of claim 14, further comprising a drive element, wherein the caliper is configured to force the first jaw device toward the second jaw device based on movement of the driving element.

16. The apparatus of claim 15, wherein the driving element comprises a drive screw configured to move the caliper with one or more rollers and pins that contact wedge ramps of each of the first jaw device and the second jaw device to apply or release pressure on the storage disc.

17. The apparatus of claim 11, wherein:
the disc sensor limits movement of a storage disc within the gripper device by providing an ingress stop.

18. A gripper device comprising:
a sensor device; and
a caliper configured to clamp a particular portion of a storage disc based on sensing information from a storage disc sensor, the particular portion comprising an arc segment along an outer edge of adjacent surfaces of the storage disc.

19. The gripper device of claim 18, wherein:
the particular portion is a data free surface of a storage disc;
the gripper device is configured to clamp and release storage discs in a disc storage system;
the sensor device is configured to sense presence of a storage disc and to limit insertion travel of a storage disc between the first jaw device and the second jaw device;
power is applied to a motor to both release and to grip a storage disc by the gripper device; and
the storage disc remains released or clamped in an absence of power applied to the motor.

20. The gripper device of claim 18, further comprising a driving element configured to move each of the first jaw device and the second jaw device with one or more of rollers and pins that contact wedge ramps of each of the first jaw device and the second jaw device to apply or release pressure on the storage disc front and back surfaces.

* * * * *